United States Patent [19]

Kang

[11] Patent Number: 5,243,584
[45] Date of Patent: Sep. 7, 1993

[54] STABILIZED OPTICAL PICK-UP UNIT FOR USE IN A DISK PLAYER

[75] Inventor: Dong J. Kang, Pusan, Rep. of Korea

[73] Assignee: Hyundai Electronics Industries Co., Ltd., Kyungki, Rep. of Korea

[21] Appl. No.: 854,069

[22] Filed: Mar. 19, 1992

[30] Foreign Application Priority Data

Mar. 23, 1991 [KR] Rep. of Korea .................. 91-4646

[51] Int. Cl.$^5$ .................................................. G11B 7/00
[52] U.S. Cl. ........................... 369/44.14; 369/44.15; 369/44.16; 369/44.21
[58] Field of Search ............... 359/813, 814, 823, 824; 369/44.11, 44.15, 44.16, 44.14, 44.17, 44.21, 44.22

[56] References Cited

U.S. PATENT DOCUMENTS

| | | | |
|---|---|---|---|
| 4,669,073 | 5/1987 | Wakabayashi et al. | 396/45 |
| 4,818,066 | 4/1989 | Nose | 359/814 |
| 4,823,336 | 4/1989 | Inada et al. | 369/215 |
| 4,838,649 | 6/1989 | Ichikawa et al. | 359/823 |
| 4,912,693 | 3/1990 | Goda | 359/823 |

FOREIGN PATENT DOCUMENTS

| | | | |
|---|---|---|---|
| 59-191147 | 10/1984 | Japan | 369/44.15 |
| 60-253028 | 12/1985 | Japan | 369/44.16 |
| 61-042747 | 3/1986 | Japan | 369/44.15 |
| 61-182642 | 8/1986 | Japan | 369/44.16 |
| 1-003830 | 1/1989 | Japan | 369/44.17 |
| 1-144239 | 6/1989 | Japan | 369/44.21 |
| 1-169743 | 7/1989 | Japan | 369/44.21 |
| 1-220137 | 9/1989 | Japan | 369/44.11 |

Primary Examiner—Aristotelis Psitos
Assistant Examiner—P. W. Huber
Attorney, Agent, or Firm—Nixon & Vanderhye

[57] ABSTRACT

An optical pick-up unit for an optical disk drive comprising a base plate secured to an optical block with an opening to enable a laser beam emitted by a laser emitter of the optical block to pass therethrough is disclosed. A support member is secured to the base plate opposite the opening and with a spring operatively secured thereto. A tracking damper is secured to the support member. A tracking support member is secured to the tracking damper and further includes a center of gravity with an insert hole formed therein. A support element extends through the insert hole and has a recess formed into each end of the support element. A pin is secured to the spring and another pin is secured to the base plate such that the pins are aligned with the insert hole and contact the support element, respectively. An objective lens is positioned over the opening and is secured to the tracking support member. A balance weight is positioned on the tracking support member opposite the objective lens for maintaining the center of gravity of the tracking support member at the insert hole upon securing the objective lens to the tracking support member such that the tracking damper and the support element act on the tracking support member to enable the objective lens to be stabilized in a focusing direction and in a tracking direction.

11 Claims, 3 Drawing Sheets

STABILIZED OPTICAL PICK-UP UNIT FOR USE IN A DISK PLAYER

BACKGROUND OF INVENTION

Field of the Invention

The present invention relates to an optical pick-up unit for use with an optical disk drive apparatus and, more particularly, to an optical pick-up unit which prevents objective lens movement or vibration due to an exterior shock or acceleration.

Information Disclosure Statement

In a conventional optical pick-up unit 1 of an optical disk drive apparatus as shown in FIG. 1, an objective lens 2 is fixed to a support member 3, which can move freely. A movement member 4 is connected to the support member 2 by a pair of horizontal leaf springs 5, 6. The movement member 4 can move upward and downward and therefore the objective lens 2 can be moved to a focusing direction (A—A direction). The pair of leaf springs 5, 6 are each formed of a plate spring, respectively, and therefore the objective lens 2 can move in a tracking direction (B—B direction) which is at a right angle to the focusing direction.

However, the objective lens 2 of the optical pick-up unit 1, as described above, is subject to moving in the tracking direction as a result of the unit experiencing a shock or acceleration, especially where the shock or acceleration is in the same direction as the tracking direction. That is, because the lens support member 3, which supports the objective lens 2, is fixed to the end of the pair of horizontal leaf springs 5, 6, as shown in FIG. 1, a jarring force is generated at the lens support member 3 by a shock or acceleration imposed in the tracking direction. Therefore, the lens support member 3 moves with a certain length "X" as shown at FIG. 1, and the location of the objective lens 2 deviates from the track of an optical disk.

Another conventional optical pick-up unit 10 is illustrated at FIG. 2. A support axis 9 is received in an aperture 8 formed at the center of a cylindrical shaped lens support member 7. The lens support member 7 can move upward and downward along the support axis 9 and be rotated in a tracking direction (C—C direction). An objective lens 12 is installed in the lens support member 7 with the axis of the objective lens 12 being parallel to the support axis 9. A balance weight 11 is positioned opposite to the objective lens 12. The objective lens 12 can be moved to a focusing and tracking direction by movement of the lens support member 7. In the optical pick-up unit shown in FIG. 2, rotational movement due to an exterior shock or acceleration can be prevented. But for the rotation and focusing movement of the lens support member 7, a clearance "Y" must exist between the support axis 9 and the aperture 8 of the lens support member 7. Therefore, when an exterior shock or acceleration is inflicted to the optical pick-up unit 10, the lens support member 7 vibrates in the tracking direction (C—C direction) and consequently deviates from the intended location of the objective lens 12 toward a record track of an optical disk.

The conventional optical disk drive apparatus using the optical pick-up units 1, 10 described above cannot prevent vibration of the objective lens due to an exterior shock or acceleration which results in the loss of the desired record track.

Thus, it is an object of the present invention to provide an optical pick-up unit which can prevent movement of an objective lens in the presence of an exterior shock or acceleration of the optical pick-up unit in order that correct data can be obtained in spite of the shock or acceleration.

The preceding object should be construed as merely presenting a few of the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

The optical pick-up unit for use with an optical disk drive apparatus having an optical block with a laser emitter, is defined by the claims with a specific embodiment shown in the attached drawings. For the purpose of summarizing the invention, the invention relates to an optical pick-up unit comprising a base plate 31 secured to the optical block and having an opening 34 formed therein to enable the laser beam emitted by the laser emitter of the optical block to pass therethrough. A support member 36 is rigidly secured to the base plate 31 opposite the opening 34 formed in the base plate 31 and with the support member further including a spring 29 operatively secured thereto. A spring receiving member 54 is preferably secured to the support member 36 for housing the spring 29. A tracking damper 37 absorbs vibrational energy while permitting intended tracking changes and is formed of resilient material and has a pair of ends with one end secured to the support member 36. A tracking support member 28 is secured to the other end of the tracking damper 37 to thereby dampen any tracking movement of the tracking support member 28 and further including a center of gravity with an insert hole 51 formed therethrough. A support element 30 is used to absorb vibrational energy and permit intended tracking changes. The support element extends through the insert hole 51 and has a recess 52 formed into each terminal end of the support element 30. A pair of pins 48, 49 is used with one of the pins being operatively secured to the spring 29 and with the remaining pin being operatively secured to the base plate 31 in such a manner where each the pin is aligned with the insert hole 51 formed in the tracking support member 28 and contacts one of the recesses formed at each terminal end of the support element 30 such that the tracking support member 28 is further supported by a force created by the spring 29 acting on said pins 48, 49 and a frictional force created between each the pin 48, 49 and each respective the recess formed into the support element 30. Each end of each pin 48, 49 is preferably tapered to increase frictional engagement with the recess 52 of the support element 30, respectively, and each taper is of a size to permit intended movement "Z" within each recess, respectively. An objective lens 70 is operatively positioned over the opening 34 formed in the base plate 31 to enable laser light emitted by the laser emitter to be focussed and with the lens 70 being secured to the tracking support member 28. A balance weight 11 is preferably positioned opposite to the objective lens 70 on or into the tracking support member 28 for maintaining the center of gravity of the tracking support member 28 at the insert hole 51 upon securing the objective lens to the tracking support member 28. Thus, the tracking damper 37 and the support element 30 act on the tracking support member 28 to enable the objective lens 70 to be stabilized in a focusing direction and in a tracking direction in the presence of unit 32 jarring vibrations.

The optical pick-up unit may further include an objective lens support member 56 for securing the objective lens 70 to the tracking support member 28.

Preferably, the optical pick-up unit of the present invention includes a pair of first coils 59, 60 with one of the coils being secured to and proximate each side of the objective lens, respectively. A pair of first yokes (cores) 41, 42 are received into the first coils 59, 60, respectively. A pair of the second coils 61, 62 are used with one of the second coils fixed to one of the first coils 59, 60, respectively. A pair of second yokes 43, 44 are secured to the base plate 31 opposite the second coils 61, 62, respectively. A pair of permanent magnets 39, 40 are operatively secured to each the second yokes 43, 44, respectively, such that in use when electrical current is supplied to the first coils 59, 60, the objective lens 70 is able to be focussed by movement in one direction and when electrical current is supplied to the second coils, the objective lens 70 is able to be focussed by movement in a direction opposite to the direction upon activating the first coils.

A pair horizontal leaf springs 21, 22 permit the objective lens to move in a focussing direction. The leaf springs extend between the objective lens and the tracking support member 28, with each horizontal leaf spring being secured to the objective lens and the tracking support member 28, respectively, in a spaced apart manner to maintain the angular orientation of the objective lens relative to its vertical axis upon movement to a focussing point. An objective lens fixture 55 can be used to secure the objective lens support member to the leaf springs 21, 22.

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out -the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which.

Similar reference characters refer to similar parts throughout the several view of the drawings.

DETAILED DESCRIPTION OF THE INVENTION

Figure 1:
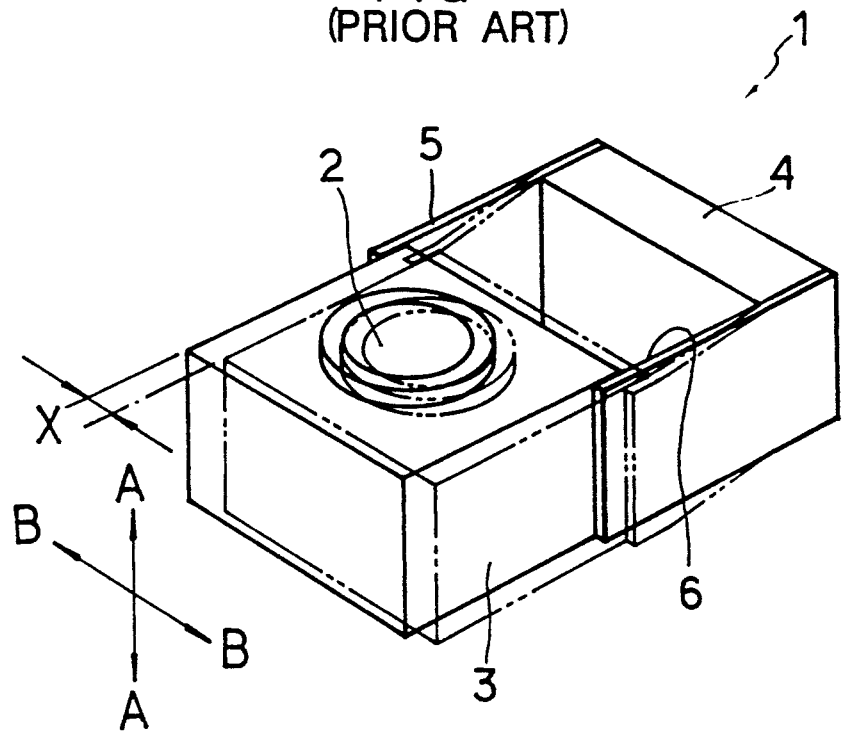
FIG. 1 is a perspective view of a conventional optical pick-up unit.
Figure 2:
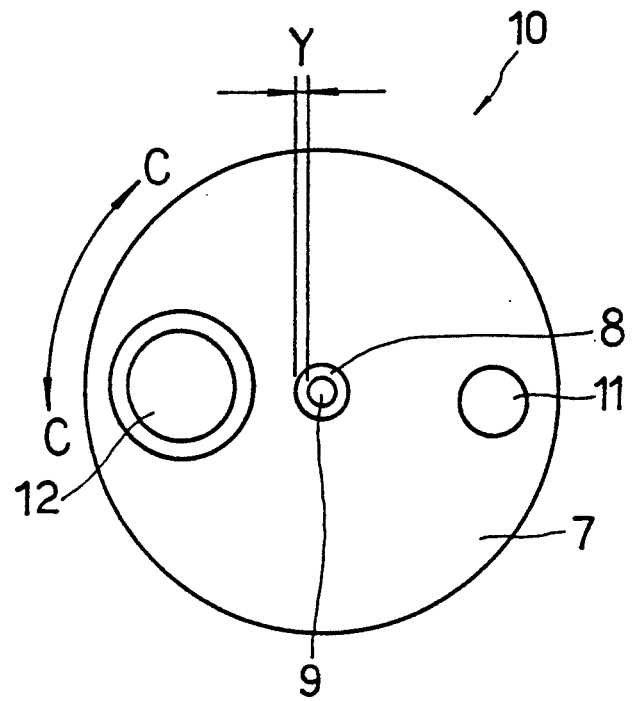
FIG. 2 is a plan view of another conventional optical pick-up unit.

FIGS. 1 and 2 are a perspective view and a plan view, respectively, of a conventional optical pick-up unit and are discussed above.

Figure 3:
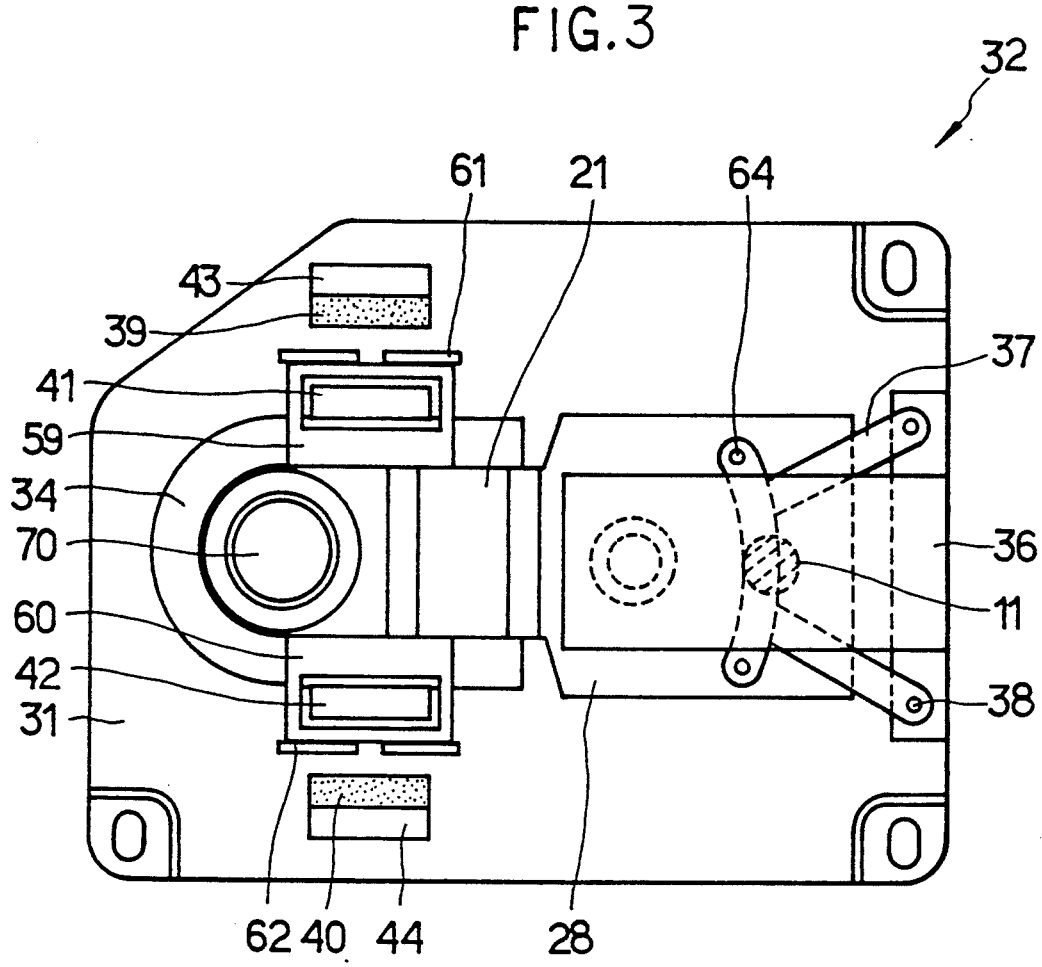
FIG. 3 is a plan view of the present invention.
Figure 4:
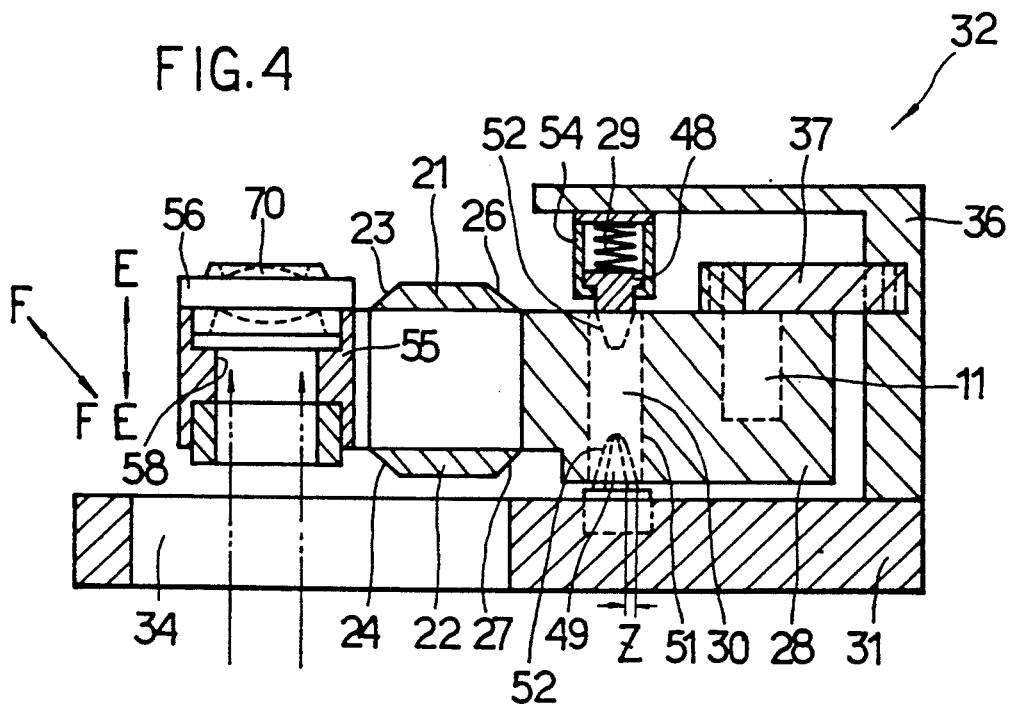
FIG. 4 is a cross sectional view of the present invention.
Figure 5:
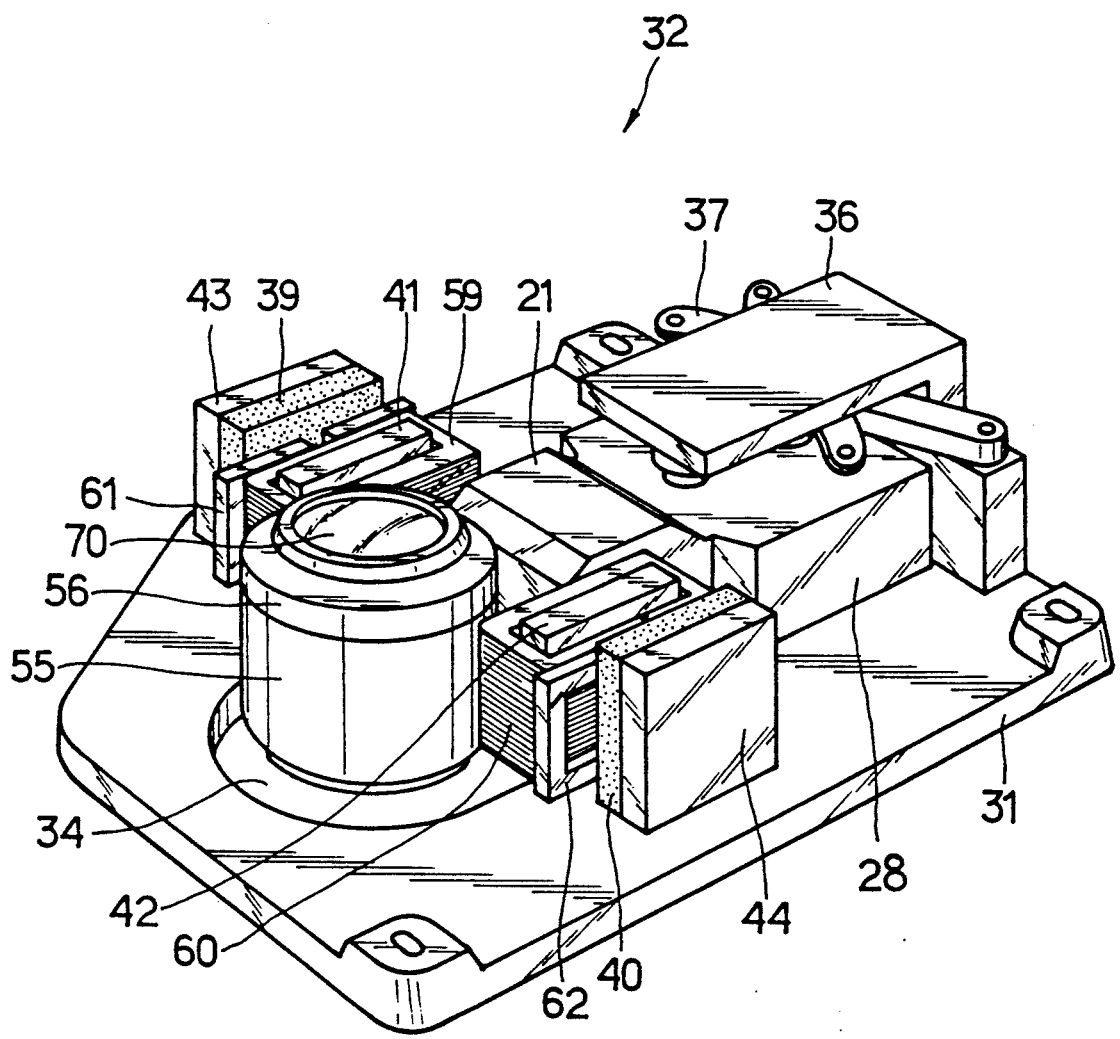
FIG. 5 is a perspective view of the present invention.

FIG. 3 is a plan view of the present invention; and FIG. 4 is a cross sectional view of the present invention. FIGS. 3-5 show the structure of the present invention.

A base plate 31 having a square shape and an opening 34 formed at a front part of the base plate 31 is used. The base plate 31 is secured on an optical block which is not shown in the FIGURES. The optical block, which does not form part of the present invention, is known and comprises a semiconductor laser which emits a laser beam, a collimator lens which guides the laser beam emitted to an objective lens, and a ¼ wavelength plate, a separator which separates the laser beam emitted by the semiconductor laser and light reflected from an optical disk, a detector which detects the reflected light, and a control circuit which operates a focus error signal and a tracking error signal from the reflected light detected by the detector and supplies a compensating current in accordance with the error signals. The laser beam emitted at the optical block described above passes through the opening 34 of the base plate 31 to the objective lens 70.

A support member 36 having an "L" shape is fixed to an end of the base plate 31, a tracking damper 37 is fixed to the support member 36 by a pair of fixing pins 38 and to the tracking support member 28 by pins 64. The tracking damper 37 is formed of rubber, i.e. resilient material, to dampen tracking movement of the tracking support member 28.

The tracking support member 28 is also supported by a pair of pins 48, 49 which are installed at the support member 36 and the base plate 31, respectively. Preferably, an insert hole 51 is formed at the center of gravity of the tracking support member 28 and extends through the tracking support member 28. A support element 30 having a recess 52 formed at each end of the support element 30, respectively, is securely fit into the insert hole 51. However, the pair of recesses 52 could also be formed in the tracking support member 28 itself.

Preferably, each end portion of the pins 48, 49 in contact with the recess of the support element 30 has a tapered end shape. Therefore, the end of each pin 48, 49 is received into each recess 52 of the support element 30, respectively. Consequently, the tracking support member 28 is supported by pins 48, 49 which are secured to the support member 36 and the base plate 31 respectively.

The size of the tapered end portion of each of the pins 48, 49 in contact with the respective recess is less than the size of the recess by as much as a minimum clearance "Z" so as to permit movement to that extent. Such clearance is required for normal operation. Therefore, when the tracking support member 28 is moved in a tracking direction during normal use, the tracking support member is supported safely and without deviation.

In addition, a spring receiving member 54 is fixed to the support member 36 with a spring 29 being securely received therein. The end of pin 48 which is opposite the tapered end, is secured to the spring 29. Therefore, when operatively positioned, both pins 48, 49 receive compressional force from spring 29. The tracking support member 28 is supported by spring 29 and the frictional force occurring between each pin 48, 49 and recesses of the support element 30. Therefore, the clearance problem described in the apparatus illustrated at FIG. 2 does not happen. That is, when an exterior shock r acceleration is imposed on the optical disk drive apparatus, this force is passed through the center of gravity which is the support point of the tracking support member 28. Therefore, the unit 32 can be stabilized even if the presence of a shock to or acceleration of the unit. Also when the location of the tracking support member 28 is moved in a tracking direction due to a large impact or shock, the tracking support member 28 moves only to the extent of the clearance "Z", i.e. the clearance between the side of the tapered end portion of eaoh pin 4B, 49 and the respective inner circumference of the recess 52 of the support element 30, as illustrated at FIG. 4.

Each end 26, 27 of a pair horizontal leaf springs 21, 22, respectively, is fixed to the tracking support member 28, and each remaining end 23, 24 of the horizontal leaf springs 21, 22, respectively, is fixed to the objective lens fixture 55 which has a cylindrical shape. The objective lens fixture 55 is a means to secure the objective lens to the leaf springs 21, 22. Other such means are known to those skilled in the art. Each horizontal leaf spring is a flexible spring having a plate shape. The leaf springs 21,22 are spaced apart relative to each other. Both ends of the each horizontal leaf spring 21, 22 have a taper shape.

The objective lens support member 56 is fixed to an inner wall 58 of the upper end of the objective lens fixture 55. The objective lens 70 is supported by the objective support member 56. In addition, a balance weight 11 is inserted into an aperture formed in the tracking support member 28 at a position opposite to the objective lens support member 56 to maintain the center of gravity of the tracking support member 28 at the position of the insert hole or support element 30.

Even if an exterior shock or acceleration is imposed on the optical pick-up unit 32, the tracking support member 28 is supported by the support element 30 as an axis because the balance weight 11 on or inserted into the tracking support member 28 insures the position of the center of gravity and, therefore, the objective lens 70 does not move.

The objective lens support member 56, the objective lens fixture 55 and the tracking support member 28 are connected together by the horizontal leaf springs 21, 22 (the tracking support member 28 is supported to the base plate 31 and the support member 36 by pins 48, 49), therefore the objective lens 70 can be moved in a focusing direction (E—E direction in FIG. 4) by the both horizontal leaf springs 21, 22 and in tracking direction (F—F direction in FIG. 4) about the support element 30 as the center.

In addition, a pair of first coils 59, 60 are fixed to both sides of the objective lens fixture 55 respectively, and a pair of first yokes 41,42 are received into the first coils 59, 60 respectively with a clearance therebetween as illustrated at FIG. 3. A pair of the second coils 61, 62 are fixed to the first coils 59, 60 respectively and a pair of second yokes 43, 44 are installed on the base plate 31, which are located at both sides of the opening 34. A pair of permanent magnets 39, 40 are fixed to a side surface of the both second yokes 43, 44 respectively. The permanent magnets 39, 40 are spaced apart from the second coils 61, 62 respectively. Also, the wound direction of the first coils 59, 60 and the second coils 61, 62 is different from each other to attain movement in the tracking and focussing direction by application of an electrical current thereto in operation.

FIG. 5 is a perspective view of the present invention, when current is supplied to the first coils 59, 60, the objective lens 70 is moved to downward or upward, and a pair of forces are imposed on the objective lens fixture 55 by a relationship between the both first coils 59, 60 and an electric field formed around the both first coils 59, 60, therefore the tracking support member 28 is moved substantially horizontally (tracking direction) about the support element 30 as a center by the forces described above.

By the tracking movement described above, it is possible to maintain a steady location of the objective lens 70 toward an optical disk. That is, a laser beam irradiated to an optical disk through the optical lens 70 is reflected by the record surface of the optical disk, at same time, a part of laser beam is reflected back to the optical block. Successively, a control circuit installed in the optical block reads any focusing error and/or tracking error from the reflected laser beam which is detected by a detector and which supplies a compensative current, in accordance with the extent of the errors, to the first and second coils 59, 60, 61 and 62. Therefore, as described above, it is possible to maintain a steady location of the objective lens 70 toward the optical disk.

The optical pick-up unit of the present invention the following advances over the prior art units:

(1) Because the tracking support member, which can move in a tracking direction, and the objective lens fixture are integrated together by a pair of horizontal leaf springs which can move in a focusing direction, and the tracking support member is supported by a pair of pins and support element, which are forced together by a spring, and which are installed at the center of gravity of the tracking support member, lens and the lens securing means, an exterior shock or acceleration inflicted to the optical pick-up unit is not inflicted to the objective lens directly, therefore a tracking error which may occur by movement of the objective lens in a prior art unit does not occur in a unit of the present invention; and (2) Because the tracking support member is supported with a spring, the clearance problem described in the prior art can be solved, also it is possible to support of the objective lens safely. The clearance required for normal use in the prior art devices also allows for room for a jolt to vibrate the lens. Whereas, the present device has solved this problem by using the novel support element 30, pins and spring 29.

Although this invention has been described in its preferred form with a certain degree of particularity, it is appreciated by those skilled in the art that the present disclosure of the preferred form has been made only by way of example and that numerous changes in the details of the construction, combination and arrangement of parts may be resorted to without departing from the spirit and scope of the invention.

What is claimed is:

1. A stabilized optical pick-up unit for use with an optical disk drive having an optical block with a laser beam emitter for emitting a laser beam, said optical pick-up unit comprising:

a base plate 31 secured to the optical block and having an opening 34 formed therein to enable the laser beam emitted by the laser beam emitter to pass through the base plate;

a support member 36 rigidly secured to said base plate 31 opposite said opening 34 forme din said base plate 31 and with said support member further including a spring 29 operatively secured thereto;

a tracking damper 37 for absorbing vibrational energy while permitting intended tracking changes and being formed of resilient material and having a pair of ends with one of said ends secured to said support member 36;

a tracking support member 28 secured to the other one of said ends of said tracking damper 37 to thereby dampen any tracking movement of said tracking support member 28 and further including a center of gravity with an insert hole 51 formed therethrough;

a support element 30 for absorbing vibrational energy while permitting intended tracking changes and extending through said insert hole 51 and with a recess 52 formed into each terminal end of said support element 30;

a pair of pins 48, 49 with one of said pins being operatively secured to said spring 29 and with the other one of said pins being operatively secured to said base plate 31 such that each said pin is aligned with said insert hole 51 formed in said tracking support member 28 and contacts one of said recesses formed at each terminal end of said support element 30 such that said tracking support member 28 is further supported by a force created by said spring 29 and acting on each of said pins 48, 49 and frictional force created between each of said pins 48, 49 and each respective said recess formed into said support element 30; and an objective lens 70 operatively positioned over said opening 34 forme din said base plate 31 to enable the laser beam emitted by said laser beam emitter to be focused on the optical disk and with said lens 70 secured to said tracking support member 28 such that said tracking damper 37 and said support element 30 act on said tracking support member 28 to enable said objective lens 70 to be stabilized in a focusing direction and in a tracking direction in the presence of optical disk drive jarring vibrations.

2. The optical pick-up unit of claim 1 further including an objective lens support member 56 for securing said objective lens 70.

3. Th eoptical pick-up unit of claim 2 further including:

a pair of first coils 59, 60 with one of said coils being fixed to said objective lens support member, respectively;

a pair of first yokes 41, 42 received into said first coils 59, 60, respectively;

a pair of second coils 61, 62 with one of said second coils fixed to one of said first coils 59, 60, respectively;

a pair of second yokes 43, 44 secured to said base plate 31 opposite said second coils 61, 62, respectively; and a pair of permanent magnets 39, 40 operatively secured to each said second yokes 43, 44, respectively, such that in use when electrical current is supplied to said first coils 59, 60, said objective lens 70 is able to maintain an operative position in the presence of exterior shock or acceleration of said optical pick-up unit.

4. The optical pick-up unit of claim 1 wherein each said end of each of said pins 48, 49 is tapered to increase frictional engagement with each said recess 52 of said support element 30, respectively, and each said taper is of a size to permit intended movement about each said recess, respectively.

5. The optical pick-up unit of claim 1 further including a spring receiving member 54 fixed to said support member 36 for housing said spring 29.

6. The optical pick-up unit of claim 2 further including a pair horizontal leaf springs 21, 22 for permitting said objective lens to move in a focussing direction and extending between an objective lens support member 56 and said tracking support member 28 and with each said horizontal leaf spring being secured to said objective lens support member 56 and said tracking support member 28, respectively, in a spaced apart manner to maintain the angular orientation of said objective lens relative to its vertical axis upon movement to a focussing point.

7. The optical pick-up unit of claim 1 wherein said tracking support member 28 further includes a balancing weight 11 for maintaining the center of gravity upon securing said objective lens 70 to said tracking support member 28.

8. A stabilized optical pick-up unit for use with an optical disk drive having an optical block with a laser beam emitter for emitting a laser beam onto an optical disk, said optical pick-up unit comprising:

a base plate 31 secured to the optical block and having an opening 34 formed therein to enable the laser beam emitted by the laser beam emitter to pass through the base plate;

a support member 36 rigidly secured to said base plate 31 opposite said opening 34 formed in said base plate 31 and with said support member further including a spring 29 operatively secured thereto;

a tracking damper 37 for absorbing vibrational energy while permitting intended tracking changes and being formed of resilient material and having a pair of ends with one of said ends secured to said support member 36;

a tracking support member 28 secured to the other one of said ends of said tracking damper 37 to thereby dampen any tracking movement of said tracking support member 28 and further including a center of gravity with an insert hole 51 formed therethrough;

an objective lens support member 56 secured to said tracking support member 28;

an objective lens 70 secured to said objective lens support member 56 and operatively positioned over said opening 34 formed in said base plate 31 to enable said laser beam emitter by the laser beam emitter to be focussed by said objective lens 70 on the optical disk;

a pair of horizontal leaf springs 21, 22 for permitting said objective lens to move in a focussing direction and extending between said objective lens support member 56 and said tracking support member 28 and with each said horizontal leaf spring being secured to said objective lens support member 56 and said tracking support member 28, respectively, in a spaced apart manner to maintain the angular orientation of said objective lens relative to its vertical axis upon movement to a focussing point on the optical disk;

a pair of pins 48, 49 with one of said pins being operatively secured to said spring 29 and with the other one of said pins being operatively secured to said base plate 31 such that each said pin is aligned with a center of gravity of said tracking support member 28 with said objective lens 70 secured thereto and with recesses being formed in said tracking support member 28 in alignment with said center of gravity of said tracking support member 28 with said objective lens 70 secured thereto such that each of said pin contacts one of said recesses to enable said tracking support member 28 to be balanced and further supported by a compressive force created by said spring 29 acting each said pins 48, 49 and a frictional force created between each said pins 48, 49 and each respective said recess formed into tracking support member 28 such that said tracking damper 37 and said pins act on said tracking support member 28 to enable said objective lens 70 to be stabilized in a focusing direction and in a tracking direction;

a pair of first coils 59, 60 with each of said first coils being secured to said objective lens support member 56, respectively;

a pair of first yokes 41, 42 received into said first coils 59, 60, respectively, such that in use upon providing electric current to said first coils 59, 60 said objective lens can be moved along an upward or downward focussing direction;

a pair of second coils 61, 62 with one of said second coils fixed to eac one of said first coils 59, 60, respectively;

a pair of second yokes 43, 44 secured to said base plate 31 opposite said second oils 62, 62, respectively; and a pair of permanent magnets 39, 40 operatively secured to each said second yokes 43, 44, respectively, such that in use upon providing electric current to said second coils 61, 62 said objective lens can be moved along a tracking direction such that in use when electrical current is supplied to said first coils 59, 60, and said second coils, said objective lens 70 is able to maintain an operative position in the presence of exterior shock or acceleration of said optical disk driving unit.

9. The optical pick-up unit of claim 8 further including a center of gravity with an insert hole 51 formed therethrough; and a support element 30 for absorbing vibrational energy while permitting intended tracking changes and extending through said insert hole 51 and with a recess 52 formed into each terminal end of said support element 30.

10. The optical pick-up unit of claim 9 further including a balance weight 11 of the said tracking support member 28 positioned opposite to said objective lens 70 for maintaining said center of gravity of said tracking support member 28 at said insert hole 51 formed in said tracking support member 28 upon securing said objective lens 70 to said tracking support member.

11. A stabilized optical pick-up unit for use with an optical disk drive having an optical block with a laser beam emitter for emitting a laser beam onto an optical disk, said optical pick-up unit comprising:

a base plate 31 secured to the optical block and having an opening 34 formed therein to enable the laser beam emitted by the laser emitter to pass through the base plate;

a support member 36 rigidly secured to said base plate 31 opposite said opening 34 and with said support member further including a spring 29 operatively secured thereto;

a tracking damper 37 for absorbing vibrational energy while permitting intended tracking changes and being formed of resilient material and having a pair of ends with one of said ends secured to said support member 36;

a tracking support member 28 secured to the other one of said ends of said tracking damper 37 to thereby dampen any tracking movement of said tracking support member 28 and further including a center of gravity with an insert hole 51 formed therethrough;

an objective lens 70 operatively positioned over said opening 34 formed in said base plate 31 to enable the laser beam emitted by the laser beam emitter to be focussed on the optical disc and with said lens 70 being secured to said tracking support member 28; and a pair horizontal leaf springs 21, 22 for permitting said objective lens to move in a focussing direction and extending between an objective lens support member 56 and said tracking support meber 28 and with each said horizontal leaf spring beins secured to said objective lens support member 56 and said tracking support member 28, respectively, in a spaced apart manner to maintain the angular orientation of said objective lens relative to its vertical axis upon movement to a focussing point; and a pair of pins 48, 49 with one of said pins being operatively secured to said spring 29 and with the other one of said pins being operatively secured to said base 31 such that each said pin is aligned with a center of gravity of said tracking support member 28 with said objective lens 70 secured thereto and with recesses being formed in said tracking support member 28 in alignment with said center of gravity of said tracking support member 28 with said objective lens 70 secured thereto such that each said pin contacts one of said recesses to enable said tracking support member 28 to be balanced and further supported by a compressive force created by said spring 29 acting on each said pins 48, 49 and a frictional force created between each of said pins 48, 49 and each respective said recess formed into said tracking support member 28 such that said tracking damper 37 and said pins act on said tracking support member 28 to enable said objective lens 70 to be stable in a focussing direction and in a tracking direction.

\* \* \* \* \*